US 11,799,953 B2

(12) United States Patent
Gopalarathnam

(10) Patent No.: US 11,799,953 B2
(45) Date of Patent: *Oct. 24, 2023

(54) MECHANISM TO IDENTIFY LINK DOWN REASONS

(71) Applicant: NVIDIA Corporation, Santa Clara, CA (US)

(72) Inventor: Sudharsan Dhamal Gopalarathnam, Bothell, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,185

(22) Filed: Dec. 29, 2022

(65) Prior Publication Data

US 2023/0231906 A1 Jul. 20, 2023

Related U.S. Application Data

(63) Continuation of application No. 17/580,470, filed on Jan. 20, 2022, now Pat. No. 11,582,297.

(51) Int. Cl.
*G06F 15/173* (2006.01)
*H04L 67/104* (2022.01)
(Continued)

(52) U.S. Cl.
CPC ...... *H04L 67/1055* (2013.01); *H04L 41/0654* (2013.01); *H04L 41/12* (2013.01); *H04L 67/1057* (2013.01); *H04L 67/1091* (2013.01)

(58) Field of Classification Search
CPC .................. H04L 41/0654; H04L 41/12
See application file for complete search history.

(56) References Cited

U.S. PATENT DOCUMENTS 9,262,372 B1 2/2016 Kabbani et al.
10,515,042 B1 12/2019 Yang et al.
(Continued)

FOREIGN PATENT DOCUMENTS

CN 108199859 6/2018
EP 3142296 3/2017
(Continued)

OTHER PUBLICATIONS

Banks "What is Prescriptive Topology Manager (PTM) & DOT?" Ethan Banks, Aug. 27, 2014, 7 pages [retrieved online from: ethancbanks.com/what-is-prescriptive-topology-manager-ptm-dot].
(Continued)

*Primary Examiner* — Wing F Chan
*Assistant Examiner* — Joseph R Maniwang
(74) *Attorney, Agent, or Firm* — SHERIDAN ROSS P.C.

(57) ABSTRACT

Methods, systems, and devices are provided herein for a mechanism to identify link down reasons. As described herein, a first port of a first peer device may be determined to have unexpectedly changed to a port down state. Subsequently, a topology file may be referenced to identify a second port of a second peer device with which the first peer device is intended to have a link if not for the first port being in a port down state. In some examples, port settings of the first port may be compared with port settings of the second port. If a port setting for the first port mismatches an associated port setting for the second port, an alert message may be transmitted to a network administrator indicating this mismatch as a possible reason for the first port being in the port down state.

20 Claims, 5 Drawing Sheets

(51) Int. Cl.
*H04L 41/12* (2022.01)
*H04L 41/0654* (2022.01)
*H04L 67/1087* (2022.01)

(56) References Cited

U.S. PATENT DOCUMENTS

| | | | |
|---|---|---|---|
| 10,812,988 | B1 | 10/2020 | Khan et al. |
| 10,938,739 | B1 | 3/2021 | Jain et al. |
| 11,582,297 | B1* | 2/2023 | Gopalarathnam .. H04L 67/1091 |
| 2007/0195711 | A1 | 8/2007 | Morris et al. |
| 2007/0274239 | A1* | 11/2007 | Nguyen ................. H04L 49/65 370/282 |
| 2011/0070767 | A1 | 3/2011 | Caveney et al. |
| 2016/0091685 | A1 | 3/2016 | Raza et al. |
| 2016/0099841 | A1 | 4/2016 | Tiwari et al. |
| 2016/0323153 | A1 | 11/2016 | Cordray et al. |
| 2017/0054603 | A1 | 2/2017 | Kulkarni et al. |
| 2018/0006894 | A1 | 1/2018 | Power et al. |
| 2019/0027001 | A1 | 1/2019 | Sebastian |
| 2019/0123958 | A1 | 4/2019 | Lederer et al. |
| 2019/0319868 | A1 | 10/2019 | Svennebring et al. |
| 2019/0327188 | A1 | 10/2019 | Rivaud et al. |
| 2019/0379594 | A1 | 12/2019 | Johnsen et al. |
| 2019/0385057 | A1 | 12/2019 | Litichever et al. |
| 2020/0089561 | A1 | 3/2020 | Laing et al. |
| 2020/0184784 | A1 | 6/2020 | Sainath et al. |
| 2020/0275174 | A1 | 8/2020 | Qi et al. |
| 2021/0073449 | A1 | 3/2021 | Segev et al. |
| 2021/0258238 | A1* | 8/2021 | Bose ................. G06F 9/45512 |
| 2021/0367848 | A1 | 11/2021 | Kaag |
| 2022/0006697 | A1 | 1/2022 | Hill et al. |
| 2022/0014441 | A1 | 1/2022 | Sethi et al. |
| 2022/0303331 | A1 | 9/2022 | Svennebring et al. |
| 2022/0334910 | A1 | 10/2022 | Narayanan et al. |

FOREIGN PATENT DOCUMENTS

| | | |
|---|---|---|
| RU | 2013123133 | 11/2014 |
| WO | WO 2020/238848 | 12/2020 |

OTHER PUBLICATIONS

Edelman "Prescriptive Topology Manager (PTM) support with NX-API on the Nexus 9000?" Jason Edelman's Blog, Sep. 19, 2014, 8 pages [retrieved online from: jedelman.com/home/prescriptive-topology-manager-ptm-support-with-nx-api-on-the-nexus-9000/].
Official Action for U.S. Appl. No. 17/580,470, dated Jul. 22, 2022 11 pages.
Notice of Allowance for U.S. Appl. No. 17/580,470, dated Oct. 28, 2022 9 pages.
Official Action for U.S. Appl. No. 17/580,454, dated Nov. 4, 2022 11 pages.
Extended Search Report for European Patent Application No. 23152616.1, dated Jun. 14, 2023, 10 pages.
Extended Search Report for European Patent Application No. 23152585.8, dated Jun. 13, 2023, 10 pages.
Notice of Allowance for U.S. Appl. No. 17/580,454, dated Mar. 15, 2023 5 pages.

* cited by examiner

MECHANISM TO IDENTIFY LINK DOWN REASONS

CROSS-REFERENCE TO RELATED APPLICATION

The present application is a continuation of U.S. patent application Ser. No. 17/580,470, filed on Jan. 20, 2022, entitled "Mechanism to Identify Link Down Reasons" the entire disclosure of which is hereby incorporated herein by reference, in its entirety, for all that it teaches and for all purposes.

FIELD OF THE DISCLOSURE

The present disclosure is generally directed to systems, methods, and devices for trouble-shooting connection errors between network devices, in particular, toward a mechanism to identify link down reasons.

BACKGROUND

In a network deployment, there are no easy mechanisms to identify why a specific link is down. A link may involve two (2) ports that are connected at both ends of the link. Each port is programmed with multiple settings, such as speed, auto negotiation, forward error correction (FEC), interface type, etc., and the settings on both the ends of the link must be compatible (e.g., settings for a port on a first end of the link must be compatible with settings for a port on a second end of the link). Even a small mistake when programming the setting or a small incompatibility between settings for the ports at either end of the link may cause the link to fail or to go down (e.g., the link does not come up). Debugging and finding the root cause of the link failure (e.g., link down reason) is a tedious job and may require area expertise.

BRIEF SUMMARY

Example aspects of the present disclosure include:

A method, comprising: determining that a first port of a first peer device has changed unexpectedly to a port down state; referencing a topology file to identify a second port of a second peer device with which the first peer device is intended to have a link if not for the first port being in a port down state; determining that a port setting for the first port mismatches an associated port setting for the second port; and in response to determining that the port setting for the first port mismatches the associated port setting for the second port, transmitting an alert message to a network administrator.

Any of the aspects herein, wherein the alert message comprises a description of a possible reason for the port down state.

Any of the aspects herein, wherein the description of the possible reason for the port down state comprises a description of a port setting mismatch between the first port and the second port.

Any of the aspects herein, wherein the first peer device comprises a first Link Failure Analyzer (LFA), wherein the second peer device comprises a second LFA, and wherein the first LFA communicates with the second LFA via a management network to exchange port settings.

Any of the aspects herein, wherein the topology file is maintained by a Prescriptive Topology Manager (PTM), wherein the first LFA references the topology file via the PTM, and wherein the second LFA also references the topology file via the PTM.

Any of the aspects herein, wherein a Link Failure Analyzer (LFA) is provided at one of the first peer device and the second peer device, wherein the topology file is maintained by a PTM, and wherein the LFA references the topology file via the PTM.

Any of the aspects herein, wherein the LFA is configured to obtain host name and interface name information from the topology file.

Any of the aspects herein, further comprising: determining, at the LFA, that port settings of the first port match port settings of the second port; and including information that describes a cable or connection issue as a possible source of a link failure.

Any of the aspects herein, wherein the LFA comprises a first LFA provided at the first peer device and wherein a second LFA is provided at the second peer device, and further comprising: enabling the first LFA and the second LFA to exchange the port settings of the first port and the port settings of the second port with one another; and configuring the first LFA to compare the port settings of the first port with the port settings of the second port to determine that the port settings of the first port match the port settings of the second port.

Any of the aspects herein, wherein the alert message comprises a description of a possible reason for the link failure.

A system, comprising: a processor; and a memory coupled with and readable by the processor and storing therein instructions that, when executed by the processor, cause the processor to: determine that a first port of a first peer device has changed unexpectedly to a port down state; reference a topology file to identify a second port of a second peer device with which the first peer device is intended to have a link if not for the first port being in a port down state; determine that a port setting for the first port mismatches an associated port setting for the second port; and in response to determining that the port setting for the first port mismatches the associated port setting for the second port, transmit an alert message to a network administrator.

Any of the aspects herein, wherein the alert message comprises a description of a possible reason for the port down state.

Any of the aspects herein, wherein the description of the possible reason for the port down state comprises a description of a port setting mismatch between the first port and the second port.

Any of the aspects herein, wherein the first peer device comprises a first LFA, wherein the second peer device comprises a second LFA, and wherein the first LFA communicates with the second LFA via a management network to exchange port settings.

Any of the aspects herein, wherein the topology file is maintained by a PTM, wherein the first LFA references the topology file via the PTM, and wherein the second LFA also references the topology file via the PTM.

Any of the aspects herein, wherein an LFA is provided at one of the first peer device and the second peer device, wherein the topology file is maintained by a PTM, and wherein the LFA references the topology file via the PTM.

Any of the aspects herein, wherein the LFA is configured to obtain host name and interface name information from the topology file.

Any of the aspects herein, wherein the instructions further cause the processor to: determine, at the LFA, that port settings of the first port match port settings of the second port; and include information that describes a cable or connection issue as a possible source of a link failure.

Any of the aspects herein, wherein the LFA comprises a first LFA provided at the first peer device and wherein a second LFA is provided at the second peer device, the instructions further causing the processor to: enable the first LFA and the second LFA to exchange the port settings of the first port and the port settings of the second port with one another; and configure the first LFA to compare the port settings of the first port with the port settings of the second port to determine that the port settings of the first port match the port settings of the second port.

A first peer device, comprising: a plurality of ports; an application; a processor; and a memory coupled with and readable by the processor and storing therein instructions that, when executed by the processor, cause the processor to: determine that a first port of the plurality of ports of the first peer device has changed unexpectedly to a port down state; reference, via the application, a topology file to identify a second port of a second peer device with which the first peer device is intended to have a link if not for the first port being in a port down state; determine that a port setting for the first port mismatches an associated port setting for the second port; and in response to determining that the port setting for the first port mismatches the associated port setting for the second port, transmit an alert message to a network administrator.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
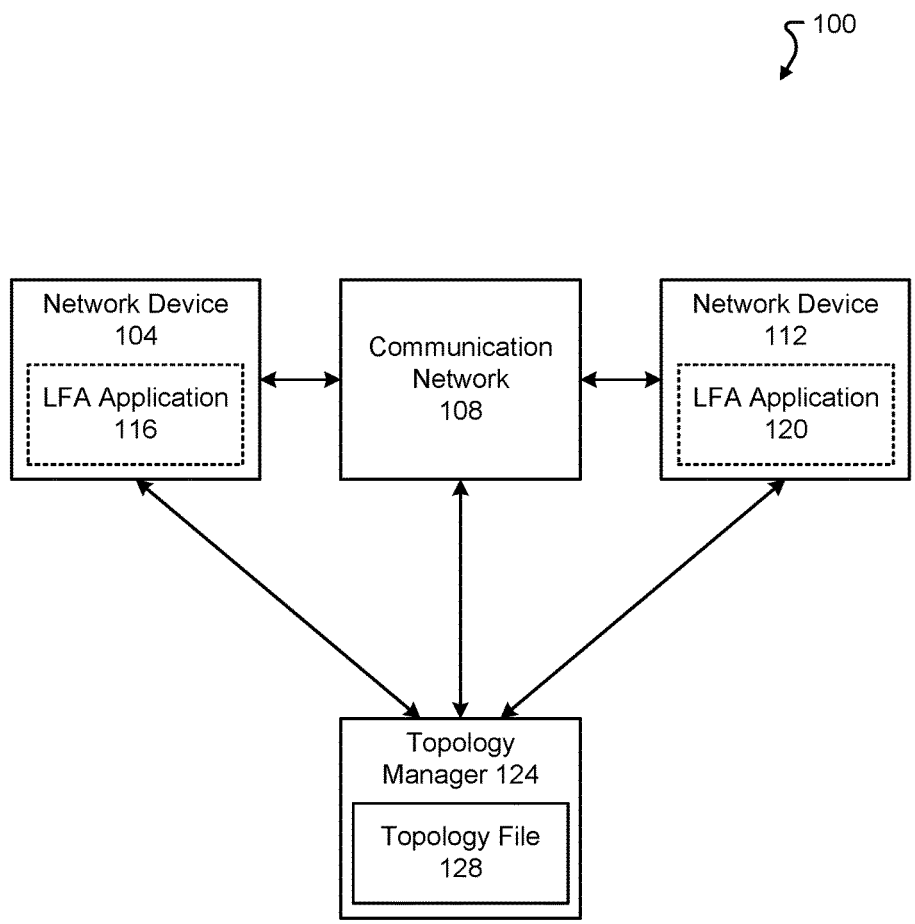
FIG. 1 illustrates a block diagram of a networking system according to at least one example embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof If implemented in software, the functions may be stored as one or more instructions or code on a computer-readable medium and executed by a hardware-based processing unit. Alternatively or additionally, functions may be implemented using machine learning models, neural networks, artificial neural networks, or combinations thereof (alone or in combination with instructions). Computer-readable media may include non-transitory computer-readable media, which corresponds to a tangible medium such as data storage media (e.g., random-access memory (RAM), read-only memory (ROM), electrically erasable programmable ROM (EEPROM), flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

In a network deployment, there are no easy mechanisms to identify why a specific link is down. A link may involve two (2) ports that are connected at both ends of the link. Each port is programmed with multiple settings, such as speed, auto negotiation, forward error correction (FEC), interface type, etc., and the settings on both the ends of the link must be compatible (e.g., settings for a port on a first end of the link must be compatible with settings for a port on a second end of the link). Even a small mistake when programming the setting or a small incompatibility between settings for the ports at either end of the link may cause the link to fail or to go down (e.g., the link does not come up). Debugging and finding the root cause of the link failure (e.g., link down reason) is a tedious job and may require area expertise.

The problem with link failures is, unlike other failure scenarios (e.g., such as where protocols sessions are down), the reason of the failure can typically be narrowed down because there is an exchange of data between the network devices through the ports that are linked (e.g., the network devices and/or ports that are to be linked may be referenced as peers or peer devices). However, in case of a link failure, it is not possible to narrow down the link down reason due to a lack of communication because the link itself has not been set up. Some underlying hardware mechanisms can be used to vaguely point out to what might be the problem or source of the link failure, but these underlying hardware mechanisms may be hard to detect (e.g., the mechanisms are not exposed) and may not exactly or specifically identify the root source of the problem (e.g., such as a mismatched configuration).

It is with respect to the above issues and other problems that the embodiments presented herein were contemplated.

Inventive concepts relate to a mechanism to identify link down reasons. For example, an application described herein (e.g., Link Failure Analyzer (LFA) application) at a first network device may leverage usage of a topology manager (e.g., Prescriptive Topology Manager (PTM)) to exchange link-based parameters (e.g., with a corresponding application at a peer device intended to be linked with the first network device) to find out a link down reason (e.g., reason why a link is down or has failed). In some cases, the PTM may be an inbox solution that uses a topology file to identify both ends of an intended link, such that when a link comes up (e.g., both connections of a link have been inserted into respective ports of network devices intended to be linked), the PTM can validate the link (e.g., using a Link Layer Discovery Protocol (LLDP)) to see if the connection is properly made (e.g., based on information included in the topology file). However, this validation may only work when the link is up or has been active.

In some examples, the topology manager may have access to additional information about respective sides or ends of an intended link (e.g., via a topology file maintained by the topology manager). For example, the topology manager may obtain information for one or more ports of a first network device at a first side or end of an intended link (e.g., source end/side) and for one or more ports of a second network device at a second side or end of the same intended link (e.g., remote or peer end/side). In some examples, the topology manager may determine this information from a topology file that is maintained by the topology manager, where the topology file indicates or lists which ports of which network devices are intended to have a link as well as the additional information about the ports and network devices that are to be linked (e.g., such as a host name, an interface name, etc. for each port or network device).

Based on this information maintained in the topology file and by the topology manager, a user application (e.g., LFA application) may be spawned (e.g., at one or both network devices at either end of an intended link). The user application may parse through a list of initialized and configured ports to find out which ports are expected to be up but are down. Those ports that are expected to be up but are down can be obtained based on ports being administratively configured to be up. After getting the list of unexpected down ports, the user application checks the topology file of the topology manager to find out information about peer ports and devices with which those unexpected ports are intended to have links. This information about the peer ports and devices acquired from the topology file may include a host name, interface name, and other information for the peer ports and devices. Based on this information (e.g., host name), the user application may form a transmission control protocol (TCP) session to communicate (e.g., through its management network) with a corresponding user application at a network device with which an unexpected down port is to be connected (e.g., remote device). Setting up parameters and configuration information for enabling the TCP session and communications between the network devices (e.g., setting up DNS, modifying access control list (ACL) rules, etc.) may be outside the scope of the present disclosure.

Once a TCP session is established between user applications at either end of an intended link (e.g., at both peer devices), the user applications may exchange link configuration parameters with which the ports for the intended link have been configured. For example, the link configuration parameters may include an administrator state, a speed, a number of lanes/breakout mode, auto negotiation, forward error correction (FEC), interface type, port error state (e.g., if applicable), etc. with which the ports for the intended link have been configured. This list of link configuration parameters is not meant to be an exhaustive list of possible parameters with which the ports can be configured, and the ports may be configured with additional link parameters. For example, some of the link parameters may be vendor specific to manufacturers of the network devices. Some of the listed parameters (e.g., such as FEC, auto-negotiation, speed, etc.) can have an administered value but a different operational value based on implementations of specific device firmware. In such cases, the user applications may exchange both the administered values and the operational values.

After exchanging the link configuration parameters with which the ports for the intended link have been configured (e.g., after information from the peer device is obtained), the user application at the network device with the unexpectedly down port cross checks the exchanged link configuration parameters to determine whether the same parameters configured at the ports at either end of the intended link are compatible (e.g., at both the remote port and on the down port locally).

If the parameters are compatible, the user application(s) may take no action. Additionally or alternatively, if some of the parameters are incompatible, the user application(s) log those incompatible parameters, and alarms may be raised. The alarms may be raised through a Simple Network Management Protocol (SNMP), telemetry, or any other available alarm methodologies. Additionally, a command-line interface (CLI) show command can be provided that highlights the mismatch configuration. For example, an alert message may be transmitted to a network administrator, where the alert message can include a description of a possible reason for the port down state (e.g., a description of a port setting mismatch between the ports at either end of the intended link).

The example below shows an example CLI show command (e.g., alert message) that is output by the user application to indicate a configuration mismatch.

Example CLI Show Command Output for Configuration Mismatch

| Local port | Remote Port | Parameter | Local Value | Remote Value |
| --- | --- | --- | --- | --- |
| Ethernet1/1 | ToR2-Ethernet1/1 | FEC | RS | None |

This example CLI show command indicates there is a configuration mismatch between an FEC parameter configured at a local port (e.g., of a first network device) that has a first value (e.g., Reed Solomon (RS) FEC) and the same FEC parameter configured at a remote port (e.g., of a second network device) that has a second value (e.g., "None"). Accordingly, a user may receive this CLI show command output and be able to quickly discern that the reason a link between the local port and the remote port is down may include the ports having a mismatch for their respective configured FEC parameters, and the user can correct the mismatch (e.g., by setting the FEC parameter at either end of the link to a same value or to compatible values).

Because this mechanism to identify link down reasons described herein is an application-level solution, it can be deployed in any network device, such as servers, storage devices, smart network interface controllers (NICs), etc., as well as on other vendor products. In some examples, the described mechanism to identify link down reasons may require the user application (e.g., LFA application) to have a plugin for obtaining port level settings (e.g., the transmission configuration parameters for the ports of the intended link).

Thus, using the topology manager (e.g., PTM), the user application of a first network device may effectively communicate with a second network device intended to have a link with the first network device (e.g., peer device) and may get the required configurations and settings of ports at the second network device to cross compare with configurations and settings of ports at the first network device. By cross comparing the configurations and settings for ports at either end of the intended link, the user application(s) may find out or narrow down the reason for the link failure (e.g., reasons as to why the link is down or link down reasons). However, this mechanism assumes the link to be correctly connected and wrongly configured, but there are other scenarios that may result in the link failing (e.g., that cause the link to be down).

In some examples, another scenario that results in the link failing (or being down) may include the connection being wrong and the link not being up. For example, if the configurations of the second network device (e.g., peer device) match or are compatible with the configurations of the first network device (e.g., as listed in the topology file maintained by the topology manager/PTM), the user application (e.g., LFA application) may identify and display the link down reason as "Connection/Cable Issue," indicating that the configurations are compatible but an issue with the connection or cable is causing the link to fail or be down. Additionally or alternatively, if there is a configuration mismatch between the configurations and settings at either end of the intended link, the user application may highlight the mismatch (e.g., transmitting an alert message describing the port setting mismatch between the ports), and if the user corrects the mismatch and still the link does not come up, the user application may identify and display the link down reason as "Connection/Cable Issue."

In some examples, another scenario that results in the link failing (or being down) may include the connection and configurations being correct and compatible but the link still does not come up. In such scenarios, the user application may identify and display the link down reason as "Connection/Cable Issue." Additionally or alternatively, another scenario that results in the link failing (or being down) may include the second network device (e.g., peer device) not being reachable. For example, the second network device may not be reachable due to a software failure, a hardware failure, or the second network device rebooting. In such scenarios, the user application may identify and display the link down reason as "Peer Unreachable." Additionally or alternatively, another scenario that results in the link failing (or being down) may include one end of the intended link being connected and the other end of the intended link not being connected or being loosely connected. In such scenarios, the user application may identify and display the link down reason as "Peer Cable Not Connected" or "Peer Unavailable."

Although the trigger for the user application at the first network device to establish communications (e.g., a TCP session) with the second network device (e.g., for the user application to reach the peer) is identifying unexpected down ports, the user application may respond to any query on a specific port regardless of a state of the port (e.g., connected or not connected). By having the user application respond to any query on a specific port, the user application may assist in identifying other reasons as to why a link is failing or is down, such as transceiver issues and loose connections.

Embodiments of the present disclosure provide technical solutions to one or more of the problems of: (1) determining link down reasons; (2) prolonged debugging time for determining link down reasons; and (3) the need for area expertise when attempting to determine link down reasons. For example, the user application and mechanism described herein (e.g., LFA application and/or mechanism) may be used to narrow down a link failure or link down reason without the link having to be up (e.g., which would not have been possible previously because an opposite end of the link (remote end) may have been unknown prior to the link being up or connected). Additionally, the mechanisms and techniques described herein may leverage a topology manager (e.g., PTM) to establish an out of band connectivity with a peer device for exchanging link configuration parameters and narrowing down the root cause of why the link is down and displaying the determined cause to the user. In some examples, this mechanism to identify link down reasons may reduce debugging time and may avoid the necessity for expert intervention in finding the link down reasons (e.g., the failure reason(s)) based on narrowing down the link down reasons.

Turning first to FIG. 1, a block diagram of a system 100 according to at least one embodiment of the present disclosure is shown. The system 100 may be used to identify link down reasons for links between ports of respective network devices that have been determined to be unexpectedly down. For example, a topology file may include information about which ports of which devices are intended to be linked, as well as specific information for those ports (e.g., host name, interface name, etc.). Subsequently, using the specific information, a connection can be made between corresponding applications at network devices at either end of an intended link that is unexpectedly down. The applications may then exchange link configuration parameters with which ports at their respective network devices have been configured. After exchanging the parameters, the application(s) may cross check configured values for each of the parameters of the ports at either end of the intended link to determine whether a configuration mismatch is present and could be the reason for the link being unexpectedly down. In either event (e.g., there is a configuration mismatch or these is not a configuration mismatch), the application(s) may transmit an alert message to a network administrator indicating a possible reason as to why the link is down, such as the configuration mismatch (e.g., if applicable), a "Connection/Cable Issue" reason, a "Peer Unreachable" reason, a "Peer Cable Not Connected" reason, etc.

The system 100 includes a network device 104, a communication network 108, and a network device 112. In at least one example embodiment, network devices 104 and 112 may correspond to a network switch (e.g., an Ethernet switch), a collection of network switches, an NIC, or any other suitable device used to control the flow of data between devices connected to communication network 108. Each network device 104 and 112 may be connected to one or more of Personal Computer (PC), a laptop, a tablet, a smartphone, a server, a collection of servers, or the like. In one specific, but non-limiting example, each network device 104 and 112 includes multiple network switches in a fixed configuration or in a modular configuration.

Examples of the communication network 108 that may be used to connect the network devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the network devices 104 and 112 using Ethernet technology. In one specific, but non-limiting example, the network devices 104 and 112 correspond to peer devices described in greater detail below.

Although not explicitly shown, the network device 104 and/or the network device 112 may include storage devices and/or processing circuitry for carrying out computing tasks, for example, tasks associated with controlling the flow of data within each network device 104 and 112 and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random-Access Memory (RAM), Read-Only Memory (ROM), variants thereof, combinations thereof, or the like.

In some embodiments, the network device 104 and/or network device 112 may include an application stored in memory, such as an LFA application 116 or LFA application 120, which is spawned and responsible for supporting the mechanism for identifying link down reasons described herein. As shown, in some examples, the LFA application 116, 120 may be spawned or may be otherwise accessed in or through the network devices 104, 112 (e.g., the LFA application 116, 120 is loaded or programmed onto the network devices 104, 112. Additionally or alternatively, the LFA application 116, 120 may be external to the network devices 104, 112 (i.e., contained in some other hardware component of the system 100 of FIG. 1).

In some embodiments, the LFA application 116, 120 at any network device 104, 112 may be initiated after a list of initialized and configured ports is generated and determining one or more ports of the network device 104, 112 in the list are expected to be up but are down (e.g., link down). Additionally or alternatively, the LFA application 116, 120 may be initiated or spawned in response to any query on a specific port regardless of a state of the port (e.g., connected or not connected). The LFA application 116, 120 at a network device 104, 112 may then identify the counterpart network device 104, 112 and/or the counterpart port that should be connected to the link down port based on a reference to a topology file 128. The topology file 128 may be maintained by a topology manager 124 (e.g., a PTM), that is provided within one of the network devices 104, 112 and/or within a switch in the communication network 108.

As a non-limiting example, the LFA application 116 provided at the network device 104 may be configured to identify that the network device 104 should be connected with network device 112 based on information in the topology file 128 (e.g., referenced via the topology manager 124). Based on the network device 104 and the network device 112 supposed to be having a connection or link, the network device 104 and the network device 112 may be referred to as peer devices. In some examples, the LFA application 116 may communicate directly with the LFA application 120 provided at the network device 112 to exchange information (e.g., link configuration parameters) to ensure ports at the network devices 104, 112 that are to be connected (e.g., based on information from the topology file 128) are configured with compatible parameters. Additionally or alternatively, the LFA application 116 may determine information and/or configuration parameters for the network device 112 (e.g., link configuration parameters for ports of the network device 112) via other components or devices of the system 100 (e.g., the topology manager 124, management devices, a management network, etc.) to compare configuration parameters between the network device 104 and the network device 112 (e.g., when determining a link down reason).

Because this mechanism to identify link down reasons is an application-level solution (e.g., uses the LFA applications 116, 120), the LFA applications 116, 120 can be deployed in any device of the system 100, such as servers, storage devices, smart NICs, etc., as well as other vendor products. Additionally, the mechanism to identify link down reasons described herein may require the LFA applications 116, 120 to have a plugin for obtaining the port level settings (e.g., from the topology file 128).

In part, the topology file 128 may indicate or list which ports of which network devices are intended to have a link. Additionally, the topology file 128 may include additional information about the ports and network devices that are to be linked, such as a host name, an interface name, etc. for each port or network device. Based on the information in the topology file 128 (e.g., accessed via the topology manager 124), LFA applications 116, 120 provided at respective network devices may form a TCP session to communicate with each other (e.g., via a management network). Subsequently, using the TCP session, the LFA applications 116, 120 may exchange link configuration parameters for the ports and network devices to be linked to determine whether the configuration parameters for each port to be linked are compatible (e.g., as part of determining link down reasons). As such, using the topology manager 124, LFA applications 116, 120 may effectively communicate and exchange information to get configurations and settings of ports to be linked to cross compare the configurations and settings and find out a reason for a link down failure.

The topology file 128 may be maintained at a centralized PTM or may be maintained in parts at a number of PTMs, which may be distributed among one or more of the network devices 104, 112. For example, the topology manager 124 may be provided at a centralized controller in the system 100 or may be distributed among a number of the network devices 104, 112.

In addition to maintaining the topology file 128, the topology manager 124 may provide other features or operations for the system 100. For example, the topology manager 124 may serve as a dynamic cabling verification tool to help detect and eliminate connection errors. For example, the topology manager 124 may take a specified network cabling plan (e.g., something many operators already generate and that is stored in a topology.dot file) and may couple the cabling plan with runtime information (e.g., derived from a Link Layer Discovery Protocol (LLDP)) to verify that the actual cabling and connections in the system 100 match the cabling plan. To verify the actual cabling and connections match the cabling plan, the topology manager 124 may communicate with different components of the system 100 (e.g., the network device 104, the communication network 108, the network device 112, etc.) to determine which network devices are linked, which specific ports are linked, or other links in the system 100 and may check these determined links with the cabling plan.

In some embodiments, the memory and processor of the network device 104, 112 may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an IC chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a PCB or collection of PCBs. It should be appreciated that any appropriate type of electrical component or collection of electrical components may be suitable for inclusion in the processing circuitry.

In addition, although not explicitly shown, it should be appreciated that the network devices 104 and 112 include one or more communication interfaces for facilitating wired and/or wireless communication between one another and other unillustrated elements of the system 100.

Figure 2:
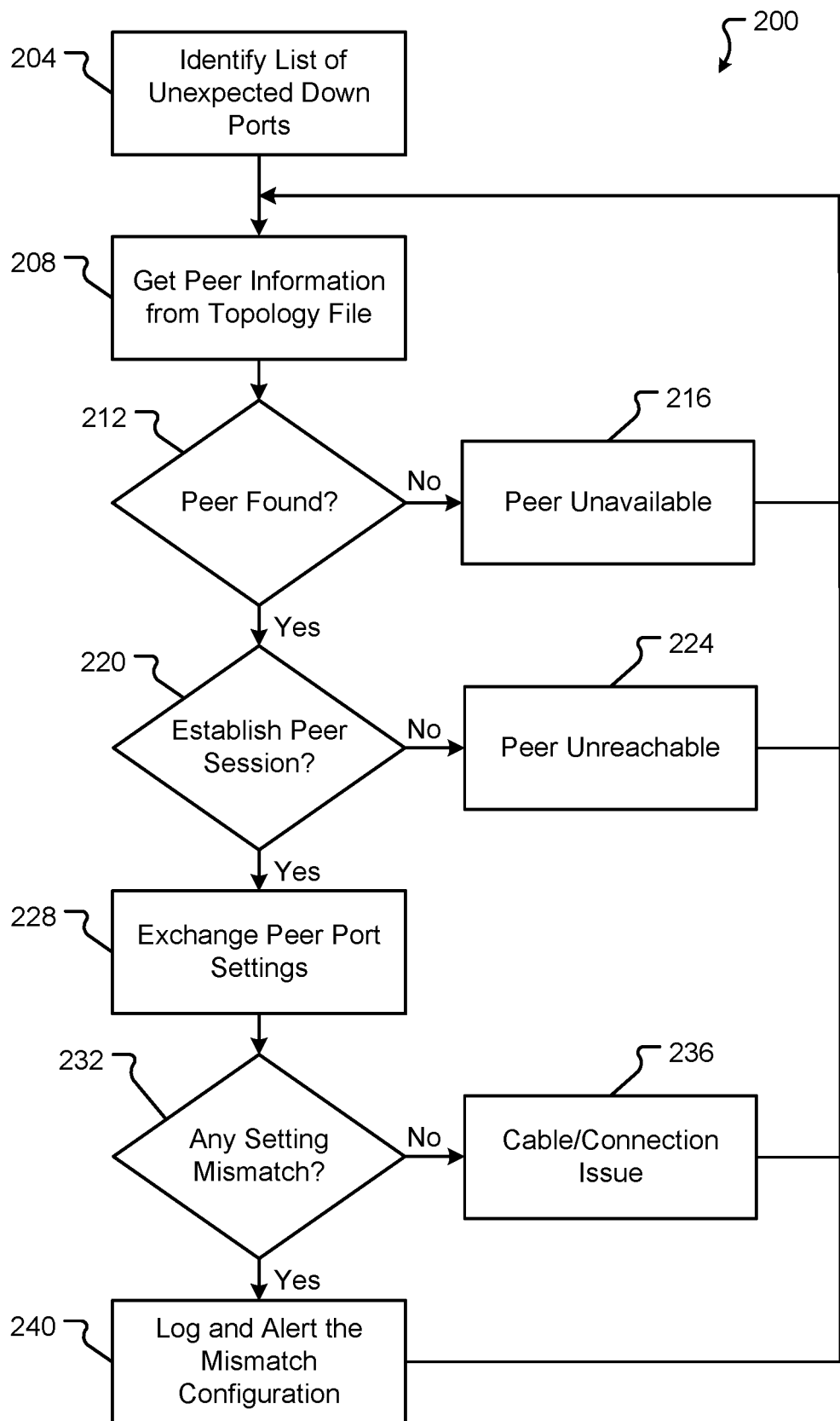
FIG. 2 illustrates a first flowchart in accordance with embodiments of the present disclosure.

FIG. 2 illustrates a flowchart 200 in accordance with aspects of the present disclosure. The flowchart 200 may include different steps or operations for a mechanism to identify link down reasons as described herein. The steps and operations of the flowchart 200 may be carried out or otherwise performed, for example, by at least one processor. The at least one processor may be the same as or similar to the processor(s) described above. The at least one processor may be part of a computing device (such as a personal computer, a laptop, a smartphone, etc.) or part of a network device or peer device as described above. For example, the steps and operations of the flowchart 200 may be carried out or otherwise performed by an application (e.g., LFA application) and/or topology manager (e.g., PTM) as described herein.

At operation 204 of the flowchart 200, an application (e.g., LFA application) at a first network device may identify a list of unexpected down ports for the first network device. For example, the application may obtain this list of unexpected down ports from a topology file maintained by a topology manager (e.g., PTM), such that the application references the topology file via the topology manager. In some examples, the application may determine which ports are unexpectedly down (e.g., those ports that are expected to be up but are down) based on ports being administratively configured to be up. As such, unless a port has a specific reason to be down (e.g., taken offline, known issues, etc., which may be indicated in the topology file), the application may determine ports that are down as indicated in the topology file to be unexpectedly down. Additionally, the list of unexpected down ports may include multiple ports that are unexpectedly down, and the remaining operations of the flowchart 200 (e.g., operations 208 through 240) may be performed for each port of the list of unexpected ports. That is, the mechanism to identify link down reasons as described herein may be used or performed for each individual port that is determined to be unexpectedly down.

At operation 208, the application may get peer information for a given port that is unexpectedly down from the topology file. For example, the application may access the topology file (e.g., via the topology manager or PTM) to determine a specific port of a second network device with which the given unexpectedly down port is intended to have a link (e.g., if the link was not down). This specific port and/or the second network device may be referred to as a peer device of the first network device. In some examples, the first network device may be referred to as a first peer device, and the second network device may be referred to as a second network device (e.g., based on the first network device and the second network device having the intended link to be peer devices for each other). As part of the peer information gathered by the application, the application may also determine additional information for the specific port, such as a host name, an interface name, etc.

At operation 212, the application at the first network device may attempt to find the second network device using the peer information gathered at operation 208. For example, the application may use the additional information for the specific port maintained in the topology file (e.g., host name of the second network device, etc.) to try and reach the second network device in a system.

At operation 216, if the application is unable to reach the second network device, the application may identify and display the link down reason for this given unexpectedly down port as "Peer Unavailable" or "Peer Cable Not Connected." That is, based on not being able to reach the second network device, the application at the first network device may identify that the port and/or the intended link for the port is down because the second network device is offline or otherwise unavailable (e.g., based on the end of the intended link at the second network device not being connected or being loosely connected). After identifying and displaying the link down reason as part of the operation 216, the flowchart 200 may revert to the operation 208, and the application at the first network device may perform the operations of the flowchart 200 starting from the operation 208 to identify a link down reason for a next unexpectedly down port from the list identified at operation 204.

Additionally or alternatively, at operation 220, if the application at the first network device is able to find the second network device, the application may attempt to establish a peer session (e.g., via a management network) with a corresponding application at the second network device. For example, the application at the first network device may attempt to establish a TCP session for enabling communications with the corresponding application at the second network device. In some examples, the application at the first network device may be referred to as the first peer device, and the corresponding application at the second network device may be referred to as the second peer device.

At operation 224, if the application is unable to establish the peer session, the application may identify and display the link down reason for this given unexpectedly down port as "Peer Unreachable." That is, based on being able to find the second network device but not being able to establish a peer session, the application at the first network device may identify that the port and/or the intended link for the port is down because the second network device is unreachable (e.g., the second network device cannot be reached due to a software failure, a hardware failure, or the second network device rebooting). After identifying and displaying the link down reason as part of the operation 224, the flowchart 200 may revert to the operation 208, and the application at the first network device may perform the operations of the flowchart 200 starting from the operation 208 to identify a link down reason for a next unexpectedly down port from the list identified at operation 204.

Additionally or alternatively, at operation 228, if the application at the first network device is able to establish the peer session with the corresponding application at the second network device, the applications may exchange peer port settings (e.g., link configuration parameters). For example, the application at the first network device may receive port settings that have been configured for the specific port to which the given unexpectedly down port is intended to have a link from the corresponding application at the second network device via the peer session. These peer port settings may include an administrator state, a speed, a number of lanes/breakout mode, auto negotiation, forward error correction (FEC), interface type, port error state (e.g., if applicable), etc. with which the specific port at the second network device has been configured. This list of peer port settings is not meant to be an exhaustive list of possible settings or parameters with which the ports can be configured, and the ports may be configured with additional port settings. For example, some of the port settings may be vendor specific to manufacturers of the network devices. Additionally, some of the listed parameters (e.g., such as FEC, auto-negotiation, speed, etc.) can have an administered value but a different operational value based on implementations of specific device firmware. In such cases, the applications may exchange both the administered values and the operational values.

At operation 232, the application at the first network device may compare settings configured for the unexpectedly down port at the first network device with the peer port settings for the port of the second network device (e.g., peer port) exchanged and received at the operation 228 to determine whether any mismatches or incompatibilities exist between the settings of both ports. For example, the application may check whether the unexpectedly down port at the first network device and the port at the second network device with which the unexpectedly down port is intended to have a link have compatible values for each configured setting (e.g., same values or values that are compatible for enabling communications).

At operation 236, if the application determines there are no setting mismatches between the unexpectedly down port and the corresponding port at the second network device for the intended link (e.g., all settings for each port are compatible for enabling communications between the ports), the application may identify and display the link down reason for this given unexpectedly down port as "Cable/Connection Issue." In some examples, the "Cable/Connection Issue" reason may indicate that the connection between the ports is wrong, the configurations and settings of the ports are compatible but an issue with the connection or cable is causing the link to fail or be down, a configuration mismatch is identified and corrected but the link remains down, the connection and configurations are correct and compatible but the link remains down, or a combination thereof. After identifying and displaying the link down reason as part of the operation 236, the flowchart 200 may revert to the operation 208, and the application at the first network device may perform the operations of the flowchart 200 starting from the operation 208 to identify a link down reason for a next unexpectedly down port from the list identified at operation 204.

Additionally or alternatively, at operation 240, if the application does determine there is at least one setting mismatch between the settings for the unexpectedly down port and the settings for the corresponding port at the second network device for the intended link, the application may log the mismatch and alert a network administrator or other user of the mismatch configuration. That is, if the application determines there is a setting mismatch between two ports that are intended to be linked, the application transmits an alert message that includes a description of a possible reason for the port to be unexpectedly down at the first network device. In some examples, the description of the possible reason for the port to be unexpectedly down may include a description of a port setting mismatch between the ports.

Accordingly, based on the described or indicated mismatch, the network administrator or other user may attempt to correct the mismatch (e.g., by configuring each port with a matching or compatible value for the previously mismatched setting) to enable communications between the ports. After identifying and displaying the link down reason as part of the operation 240 (e.g., including the setting mismatch), the flowchart 200 may revert to the operation 208, and the application at the first network device may perform the operations of the flowchart 200 starting from the operation 208 to identify a link down reason for a next unexpectedly down port from the list identified at operation 204.

Although the trigger for the application at the first network device to establish the peer session (e.g., a TCP session or communications) with the second network device is identifying the unexpected down ports at the operation 204 in the example of FIG. 2, the application may respond to any query on a specific port regardless of a state of the port (e.g., connected or not connected). By having the application respond to any query on a specific port, the application may assist in identifying other reasons as to why a link is failing or is down, such as transceiver issues and loose connections (e.g., "Peer Unavailable," "Peer Unreachable," "Cable/Connection Issue," etc.).

Figure 3:
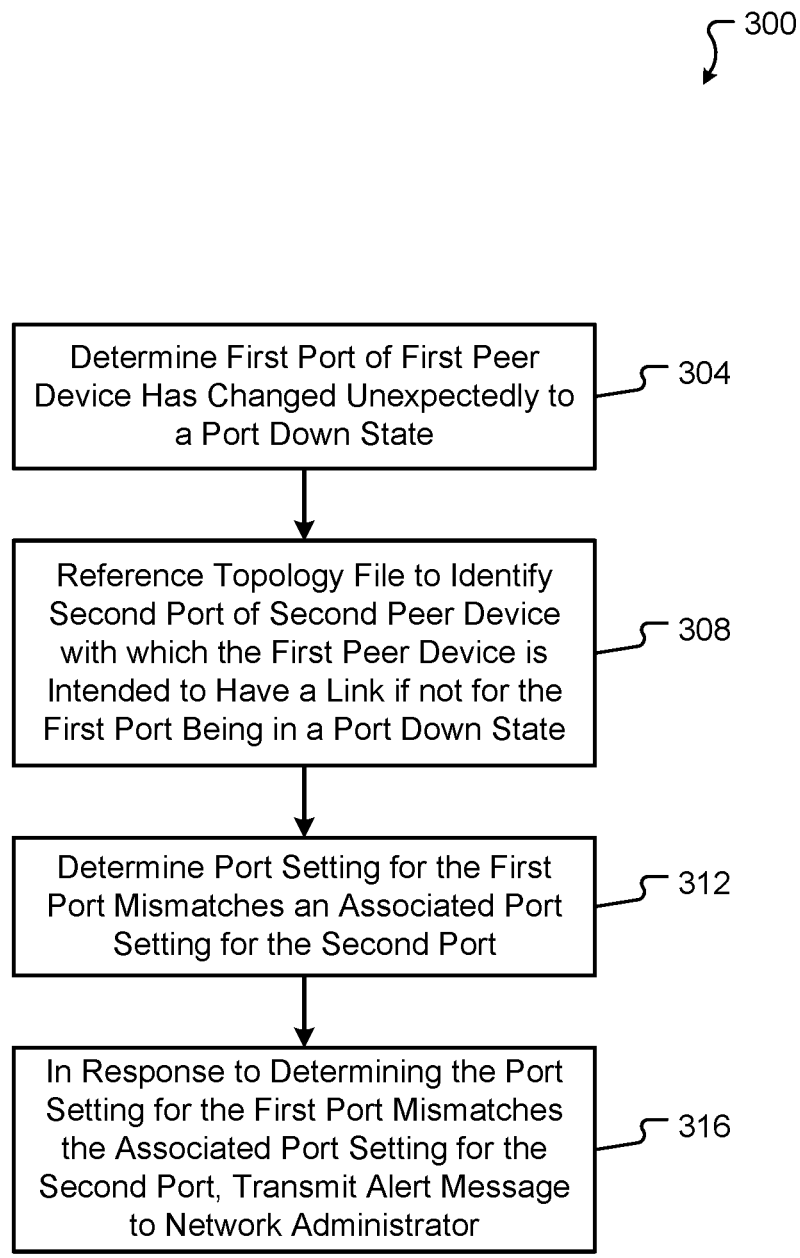
FIG. 3 illustrates a second flowchart in accordance with embodiments of the present disclosure.

FIG. 3 depicts a method 300 that may be used, for example, to identify link down reasons as described herein. For example, the method 300 may be used to determine why a first port of a first network device is down or why a link between the first port and a second port of a second network device is down (e.g., why the link or port has failed). Accordingly, using the techniques described herein, information maintained by a topology manager (e.g., a topology file or map maintained by a PTM) may be leveraged to enable exchanging link-based parameters between the first network device and the second network device to find a possible reason for why the first port is down and/or why the link between the first port and the second port is down.

The method 300 (and/or one or more steps thereof) may be carried out or otherwise performed, for example, by at least one processor. The at least one processor may be the same as or similar to the processor(s) described above. The at least one processor may be part of a computing device (such as a personal computer, a laptop, a smartphone, etc.) or part of a network device or peer device as described above. A processor other than any processor described herein may also be used to execute the method 300. The at least one processor may perform the method 300 by executing elements stored in a memory such as the memory of a computing device, a network device, or a peer device as described above. The elements stored in the memory and executed by the processor may cause the processor to execute one or more steps of a function as shown in method 300. One or more portions of a method 300 may be performed by the processor executing any of the contents of memory.

The method 300 comprises determining that a first port of a first peer device has changed unexpectedly to a port down state (step 304). For example, a list of initialized and configured ports at the first peer device may be obtained to find out which ports are expected to be up but are down. In some examples, ports that are expected to be up but are down can be obtained based on ports being administratively configured to be up.

The method 300 also comprises referencing a topology file to identify a second port of a second peer device with which the first peer device is intended to have a link if not for the first port being in a port down state (step 308). For example, the topology file may be maintained by a topology manager or PTM and may include information of ports that are intended to be linked. In some examples, the first peer device may include a first LFA or first LFA application, and the second peer device may include a second LFA or second LFA application, where the first LFA and the second LFA reference the topology file via the PTM. Additionally or alternatively, a single LFA or LFA application may be provided at one of the first peer device and the second peer device, where the single LFA application references the topology file via the PTM.

The method 300 also comprises determining that a port setting for the first port mismatches an associated port setting for the second port (step 312). In some examples, the port settings for the first port and the second port may be determined to be mismatched based on LFAs at each network device exchanging information (e.g., via a TCP session). For example, a first LFA provided at the first peer device may communicate with a second LFA provided at the second peer device via a management network to exchange port settings. To enable these communications, the LFA provided at the first peer device (e.g., first of two LFAs or a single LFA) may be configured to obtain host name and interface name information (and any other needed information) corresponding to the second port and/or the second peer device from the topology file.

The method 300 also comprises transmitting an alert message to a network administrator in response to determining that the port setting for the first port mismatches the associated port setting for the second port (step 316). For example, the alert message may include a description of a possible reason for the port down state. In some examples, the description of the possible reason for the port down state may include a description of a port setting mismatch between the first port and the second port.

The present disclosure encompasses embodiments of the method 300 that comprise more or fewer steps than those described above, and/or one or more steps that are different than the steps described above.

Figure 4:
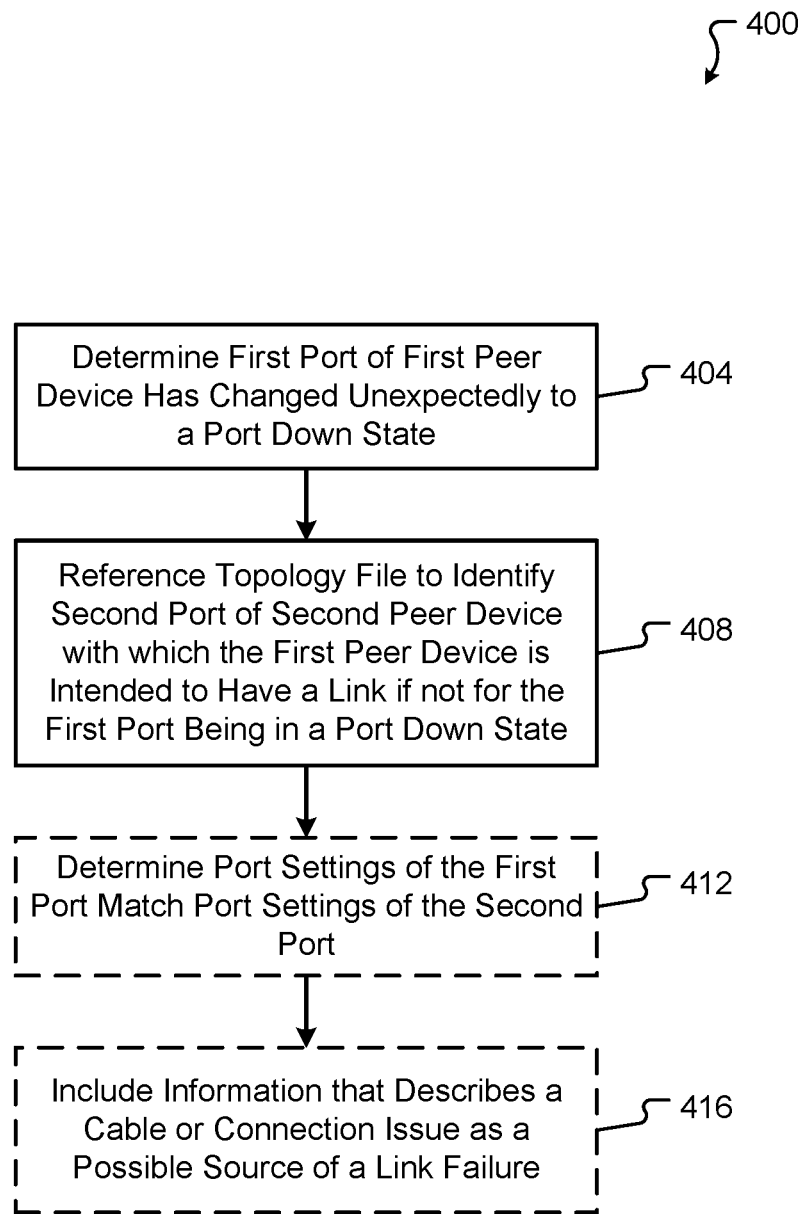
FIG. 4 illustrates a third flowchart in accordance with embodiments of the present disclosure.

FIG. 4 depicts a method 400 that may be used, for example, to identify link down reasons that are not a result of configuration mismatches as described herein.

The method 400 (and/or one or more steps thereof) may be carried out or otherwise performed, for example, by at least one processor. The at least one processor may be the same as or similar to the processor(s) described above. The at least one processor may be part of a computing device (such as a personal computer, a laptop, a smartphone, etc.) or part of a network device or peer device as described above. A processor other than any processor described herein may also be used to execute the method 400. The at least one processor may perform the method 400 by executing elements stored in a memory such as the memory of a computing device, a network device, or a peer device as described above. The elements stored in the memory and executed by the processor may cause the processor to execute one or more steps of a function as shown in method 400. One or more portions of a method 400 may be performed by the processor executing any of the contents of memory.

The method 400 comprises determining that a first port of a first peer device has changed unexpectedly to a port down state (step 404). The method 400 also comprises referencing a topology file to identify a second port of a second peer device with which the first peer device is intended to have a link if not for the first port being in a port down state (step 408).

The method 400 also comprises determining (e.g., at an LFA or LFA application provided at one or both of the first peer device and the second peer device) that port settings of the first port match port settings of the second port (step 412). For example, an LFA provided at the first peer device may determine port settings for the second port (e.g., via a TCP session with a second LFA at the second peer device, via the topology file, etc.) and may cross check those port settings for the second port with port settings of the first peer device to determine any setting mismatches or a lack thereof.

The method 400 also comprises including information that describes a cable or connection issue as a possible source of a link failure (e.g., based on determining that the port settings of the first port match the port settings of the second port) (step 416). For example, if the port settings match (or are compatible) for both ports that are intended to be linked but the first port is still in the port down state and/or the link between the ports fails, then the possible source of the link failure may be determined to be a cable or connection issue. This cable or connection issue may include or indicate that the connection between the ports is wrong, the configurations and settings of the ports are compatible but an issue with the connection or cable is causing the link to fail or be down, a configuration mismatch is identified and corrected but the link remains down, the connection and configurations are correct and compatible but the link remains down, or a combination thereof. In such examples, an alert message may be transmitted to a network administrator (or other user) that includes a description of a possible reason for the link failure.

The present disclosure encompasses embodiments of the method 400 that comprise more or fewer steps than those described above, and/or one or more steps that are different than the steps described above.

Figure 5:
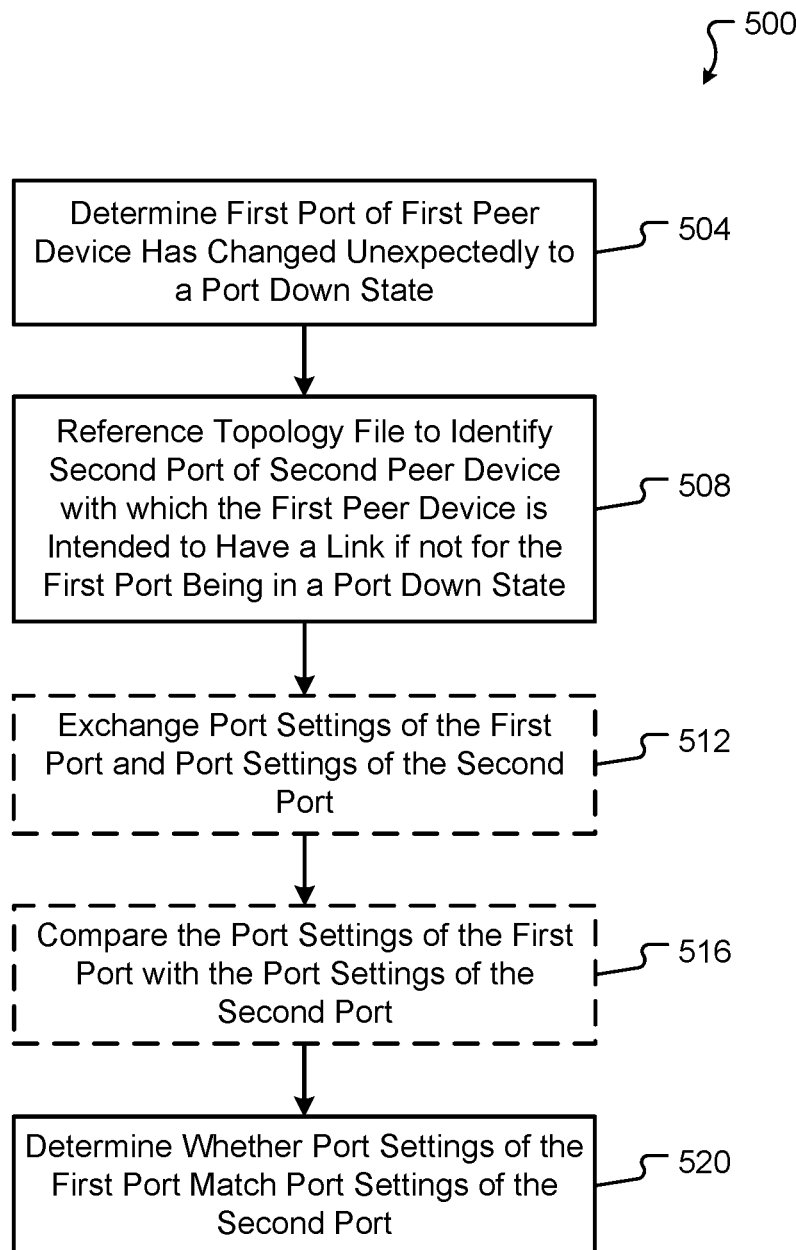
FIG. 5 illustrates a fourth flowchart in accordance with embodiments of the present disclosure.

FIG. 5 depicts a method 500 that may be used, for example, to enable communications between applications provided at different peer devices to compare port settings configured at each peer device as described herein.

The method 500 (and/or one or more steps thereof) may be carried out or otherwise performed, for example, by at least one processor. The at least one processor may be the same as or similar to the processor(s) described above. The at least one processor may be part of a computing device (such as a personal computer, a laptop, a smartphone, etc.) or part of a network device or peer device as described above. A processor other than any processor described herein may also be used to execute the method 500. The at least one processor may perform the method 500 by executing elements stored in a memory such as the memory of a computing device, a network device, or a peer device as described above. The elements stored in the memory and executed by the processor may cause the processor to execute one or more steps of a function as shown in method 500. One or more portions of a method 500 may be performed by the processor executing any of the contents of memory.

The method 500 comprises determining that a first port of a first peer device has changed unexpectedly to a port down state (step 504). The method 500 also comprises referencing a topology file to identify a second port of a second peer device with which the first peer device is intended to have a link if not for the first port being in a port down state (step 508). In some examples, a first LFA (or first LFA application) may be provided at the first peer device, and a second LFA (or second LFA application) may be provided at the second peer device.

The method 500 also comprises enabling the first LFA and the second LFA to exchange the port settings of the first port and the port settings of the second port with one another (step 512). For example, the first LFA may communicate with the second LFA via a management network (e.g., using a TCP session) to exchange port settings.

The method 500 also comprises configuring the first LFA to compare the port settings of the first port with the port settings of the second port to determine whether the port settings of the first port match the port settings of the second port (step 516). The method 500 also comprises determining whether the port settings of the first port match the port settings of the second port (step 520). In some examples, if the port settings of the first port match the port settings of the second port but the first port remains in the port down state and/or a link between the first port and the second port remains down, a reason for the port down state may be determined to be a connection or cable issue and displayed as such. Alternatively, if the port settings of the first port and the port settings of the second port are mismatched, the corresponding settings mismatch may be logged and an alert message indicating the settings mismatch may be displayed.

The present disclosure encompasses embodiments of the method 500 that comprise more or fewer steps than those described above, and/or one or more steps that are different than the steps described above.

As noted above, the present disclosure encompasses methods with fewer than all of the steps identified in FIGS. 3, 4, and 5 (and the corresponding description of the methods 300, 400, and 500), as well as methods that include additional steps beyond those identified in FIGS. 3, 4, and 5 (and the corresponding description of the methods 300, 400, and 500). The present disclosure also encompasses methods that comprise one or more steps from one method described herein, and one or more steps from another method described herein. Any correlation described herein may be or comprise a registration or any other correlation.

Any of the steps, functions, and operations discussed herein can be performed continuously and automatically.

The exemplary systems and methods of this disclosure have been described in relation to a dual connect switch module. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A method, comprising:
   determining that a first port of a first peer device has changed unexpectedly to a port down state;
   referencing a topology file to identify a second port of a second peer device with which the first peer device is intended to have a link if not for the first port being in a port down state;
   obtaining link configuration parameters of the first port;
   obtaining link configuration parameters of the second port;
   cross-checking the link configuration parameters of the first port with the link configuration parameters of the second port;
   determining, based on the cross-checking, that a port setting for the first port mismatches an associated port setting for the second port; and
   in response to determining that the port setting for the first port mismatches the associated port setting for the second port, transmitting an alert message to a network administrator.

2. The method of claim 1, wherein the alert message comprises a description of a possible reason for the port down state.

3. The method of claim 2, wherein the description of the possible reason for the port down state comprises a description of a port setting mismatch between the first port and the second port.

4. The method of claim 1, wherein the port setting for the first port comprises at least one parameter different from the associated port setting for the second port.

5. The method of claim 4, wherein the at least one parameter comprises one or more of administrator state, speed, number of lanes, breakout mode, auto negotiation, forward error correction, interface type, and port error state.

6. The method of claim 1, wherein a Link Failure Analyzer (LFA) is provided at one of the first peer device and the second peer device, wherein the topology file is maintained by a Prescriptive Topology Manager (PTM), and wherein the LFA references the topology file via the PTM.

7. The method of claim 6, wherein the LFA is configured to obtain host name and interface name information from the topology file.

8. The method of claim 6, further comprising:
   determining, at the LFA, that port settings of the first port match port settings of the second port; and
   including information in the alert message that describes a cable or connection issue as a possible source of a link failure.

9. The method of claim 8, wherein the LFA comprises a first LFA provided at the first peer device and wherein a second LFA is provided at the second peer device, the method further comprising:
   enabling the first LFA and the second LFA to exchange the port settings of the first port and the port settings of the second port with one another; and
   configuring the first LFA to compare the port settings of the first port with the port settings of the second port to determine that the port settings of the first port match the port settings of the second port.

10. The method of claim 8, wherein the alert message comprises a description of a possible reason for a link failure.

11. A system, comprising:
    a processor; and
    a memory coupled with and readable by the processor and storing therein instructions that, when executed by the processor, cause the processor to:
    determine that a first port of a first peer device has changed unexpectedly to a port down state;
    reference a topology file to identify a second port of a second peer device with which the first peer device is intended to have a link if not for the first port being in a port down state;
    obtain link configuration parameters of the first port;
    obtain link configuration parameters of the second port;
    cross-check the link configuration parameters of the first port with the link configuration parameters of the second port;
    determine, based on the cross-check, that a port setting for the first port mismatches an associated port setting for the second port; and
    in response to determining that the port setting for the first port mismatches the associated port setting for the second port, transmit an alert message to a network administrator.

12. The system of claim 11, wherein the alert message comprises a description of a possible reason for the port down state.

13. The system of claim 12, wherein the description of the possible reason for the port down state comprises a description of a port setting mismatch between the first port and the second port.

14. The system of claim 11, wherein the port setting for the first port comprises at least one parameter different from the associated port setting for the second port.

15. The system of claim 14, wherein the at least one parameter comprises one or more of administrator state, speed, number of lanes, breakout mode, auto negotiation, forward error correction, interface type, and port error state.

16. The system of claim 11, wherein a Link Failure Analyzer (LFA) is provided at one of the first peer device and the second peer device, wherein the topology file is maintained by a Prescriptive Topology Manager (PTM), and wherein the LFA references the topology file via the PTM.

17. The system of claim 16, wherein the LFA is configured to obtain host name and interface name information from the topology file.

18. The system of claim 16, wherein the instructions further cause the processor to:
    determine, at the LFA, that port settings of the first port match port settings of the second port; and
    include information in the alert message that describes a cable or connection issue as a possible source of a link failure.

19. The system of claim 18, wherein the LFA comprises a first LFA provided at the first peer device and wherein a second LFA is provided at the second peer device, the instructions further causing the processor to:

enable the first LFA and the second LFA to exchange the port settings of the first port and the port settings of the second port with one another; and configure the first LFA to compare the port settings of the first port with the port settings of the second port to determine that the port settings of the first port match the port settings of the second port.

20. A first peer device, comprising:

a plurality of ports;

an application;

a processor; and a memory coupled with and readable by the processor and storing therein instructions that, when executed by the processor, cause the processor to:

determine that a first port of the plurality of ports of the first peer device has changed unexpectedly to a port down state;

reference, via the application, a topology file to identify a second port of a second peer device with which the first peer device is intended to have a link if not for the first port being in a port down state;

obtain link configuration parameters of the first port;

obtain link configuration parameters of the second port;

cross-check the link configuration parameters of the first port with the link configuration parameters of the second port;

determine, based on the cross-check, that a port setting for the first port mismatches an associated port setting for the second port; and in response to determining that the port setting for the first port mismatches the associated port setting for the second port, transmit an alert message to a network administrator.

\* \* \* \* \*